United States Patent
Lee et al.

(10) Patent No.: US 7,866,000 B2
(45) Date of Patent: Jan. 11, 2011

(54) SWING HINGE APPARATUS OF PORTABLE TERMINAL

(75) Inventors: Dong-Yup Lee, Gumi-si (KR); Dong-Chul Song, Gumi-si (KR); Sang-Heon Lee, Seongnam-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 658 days.

(21) Appl. No.: 11/777,445

(22) Filed: Jul. 13, 2007

(65) Prior Publication Data

US 2008/0016649 A1 Jan. 24, 2008

(30) Foreign Application Priority Data

Jul. 24, 2006 (KR) .................. 20-2006-0019978 U
Mar. 12, 2007 (KR) ...................... 10-2007-0024065

(51) Int. Cl.
*E05D 11/10* (2006.01)
(52) U.S. Cl. .................. 16/334; 16/344; 379/433.13; 455/575.3
(58) Field of Classification Search ............... 16/307, 16/303, 330, 333–334, 277, 284, 286, 296, 16/325, 341–344; 379/433.12, 433.13; 455/575.4, 455/575.3; 361/679.27
See application file for complete search history.

(56) References Cited

U.S. PATENT DOCUMENTS

| | | | | |
|---|---|---|---|---|
| 7,036,186 B2* | 5/2006 | Jeong et al. | .................. | 16/303 |
| 7,184,805 B2* | 2/2007 | Cho et al. | ................ | 455/575.4 |
| 7,287,302 B2* | 10/2007 | Park et al. | ..................... | 16/330 |
| 7,529,568 B2* | 5/2009 | Jeun | ........................ | 455/575.1 |
| 7,590,435 B2* | 9/2009 | Park et al. | ................ | 455/575.3 |
| 7,610,067 B2* | 10/2009 | Cho et al. | ................ | 455/575.3 |
| 7,624,477 B2* | 12/2009 | Chien et al. | ................... | 16/286 |
| 2005/0137000 A1* | 6/2005 | Toh et al. | ................. | 455/575.4 |
| 2005/0202856 A1* | 9/2005 | Park et al. | ................ | 455/575.1 |
| 2005/0245294 A1 | 11/2005 | Gupte et al. | | |
| 2006/0225249 A1* | 10/2006 | Cho | ........................... | 16/334 |
| 2007/0119024 A1* | 5/2007 | Kim | ........................... | 16/337 |
| 2008/0064342 A1* | 3/2008 | Son et al. | .................. | 455/90.3 |

FOREIGN PATENT DOCUMENTS

| | | | |
|---|---|---|---|
| KR | 10-2004-0010123 A | 1/2004 | |
| KR | 10-2005-0060474 A | 6/2005 | |
| KR | 20-0428621 Y1 | 10/2006 | |

* cited by examiner

*Primary Examiner*—William L. Miller
(74) *Attorney, Agent, or Firm*—Jefferson IP Law., LLP

(57) ABSTRACT

A swing hinge apparatus of a portable terminal is provided. In the portable terminal, a pair of housings is rotatably assembled while facing each other. The swing hinge apparatus includes a lower casing mounted and fixed to a first housing from among the pair of housings, a cam member mounted and fixed to a second housing from among the pair of housings and rotatably received in the lower casing, a guide groove formed on the lower casing and extending along a circumference, and a guide protrusion formed on a first surface of the cam member and moving along the guide groove according to rotation of the cam member, wherein both ends of the guide protrusion have inclined outer walls, both ends of the guide groove have inclined inner walls, and the guide protrusion is engaged with one of the inclined inner walls of the both ends of the guide groove, so as to limit a range of rotation of the cam member.

17 Claims, 8 Drawing Sheets

SWING HINGE APPARATUS OF PORTABLE TERMINAL

PRIORITY

This application claims the benefit under 35 U.S.C. §119 (a) of a Korean utility model application filed in the Korean Industrial Property Office on Jul. 24, 2006 and assigned Serial No. 20-2006-0019978, and a Korean patent application filed in the Korean Industrial Property Office on Mar. 12, 2007 and assigned Serial No. 10-2007-0024065, the entire disclosures of each of which are hereby incorporated by references.

BACKGROUND OF THE INVENTION

1. Field of the Invention

The present invention relates to a portable terminal. More particularly, the present invention relates to a swing hinge apparatus of a portable terminal, by which a pair of housings can be rotatably assembled while facing each other.

2. Description of the Related Art

In general, a portable terminal refers to a device used to provide wireless communication between users or between a user and a service provider using a mobile communication station and the like. Portable terminals are classified into bar-type terminals, flip-type terminals, and folder-type terminals according to their appearance.

The bar-type portable terminal has a single body housing on which a data input/output unit, a transmitter, and a receiver are mounted. A keypad used as the data input/output unit is always exposed to the outside and may result in the malfunction thereof. Further, there is limitation in the miniaturization of the portable terminal because it is difficult to secure a distance between the transmitter and receiver.

The flip-type portable terminal has a body, a flip and a hinge module for connecting the flip to the body. The body includes a data input/output unit, a transmitter, and a receiver mounted thereon. The flip covers the keypad used as the data input unit so as to prevent the malfunction of the keypad. However, there is also a limitation in the miniaturization of the flip type portable terminal because it is difficult to secure a distance between the transmitter and the receiver.

The folder-type portable terminal includes a body a folder, and a hinge apparatus for rotatably connecting the folder to the body, in which the folder rotates to open and close the body. When the folder is closed over the body in a communication-standby mode, it is possible to prevent the malfunction of the keypad. As a transmitter and a receiver are arranged on the body and the folder respectively in a communication mode, it is possible to secure a sufficient distance between the transmitter and the receiver. Thus, there is an advantage of miniaturizing the portable terminal.

Recently, a sliding-type portable terminal in which a pair of housings are assembled to move in a straight direction while facing each other has appeared, so that it shares a large portion of the market of mobile communication terminals, together with the folder-type portable terminals.

Meanwhile, as use of the portable terminals becomes popular, tastes of users for a design of the portable terminal come to be diverse, and thus manufacturers of the portable terminal make efforts to meet them. As a result of their efforts, swing-type portable terminals, rotary-type portable terminals, and combination-type portable terminals using a sliding-folding operation or a folding-swing operation have appeared.

However, the swing-type portable terminals and the rotary-type portable terminals, or the sliding-folding portable terminals and the folding-swing portable terminals have difficulty in obtaining structural stability, so that there is a limitation on releasing to the market as products. Further, due to the difficulty in obtaining the structural stability, there arises a problem in increasing costs for manufacturing a real product.

Furthermore, it is difficult to control a stop position of housings in a portable terminal that is opened/closed by a swing operation, users experience an inconvenience in a portable terminal opened/closed in a passive manner, the cost for manufacturing is increased in a portable terminal automatically opened/closed by using a motor and the like, and there is a risk of breakdown at the moment of stopping rotation because a spring is used in a portable terminal opened/closed semi-automatically.

SUMMARY OF THE INVENTION

An aspect of the present invention is to address the above-mentioned problems and/or disadvantages and to provide at least the advantages described below. Accordingly, an aspect of the present invention is to provide a swing hinge apparatus of a portable terminal, by which a pair of housings can be assembled with each other in a stable manner.

Another aspect of the present invention is to provide a swing hinge apparatus of a portable terminal, by which structural stability is obtained and costs for manufacturing can be reduced.

Another aspect of the present invention is to provide a swing hinge apparatus of a portable terminal in which manufacturing costs are inexpensive, an open/close operation is convenient, and risk of breakdown is decreased.

In accordance with an aspect of the present invention, a swing hinge apparatus of a portable terminal is provided. In the swing hinge apparatus, a pair of housings is rotatably assembled while facing each other. The swing hinge apparatus includes a lower casing mounted and fixed to a first housing from among the pair of housings, a cam member mounted and fixed to a second housing from among the pair of housings and rotatably received in the lower casing, a guide groove formed on the lower casing and extending along a circumference, and a guide protrusion formed on a first surface of the cam member and moving along the guide groove according to rotation of the cam member, wherein both ends of the guide protrusion have inclined outer walls, both ends of the guide groove have inclined inner walls, and the guide protrusion is engaged with one of the inclined inner walls of the both ends of the guide groove, so as to limit a range of rotation of the cam member.

In accordance with an aspect of the present invention, the outer walls of both ends of the guide protrusion and the inner walls of both ends of the guide groove are inclined so as to limit a range of rotation of the cam member, such that impact occurring at the moment when the rotation of the cam member stops can be reduced.

In accordance with an aspect of the present invention, in the swing hinge device, an elastic member is interposed between the lower casing and the cam member to provide a driving force for rotating the cam member, so that it is convenient to open/close the portable terminal.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations will be omitted for clarity and conciseness.

Figure 1:
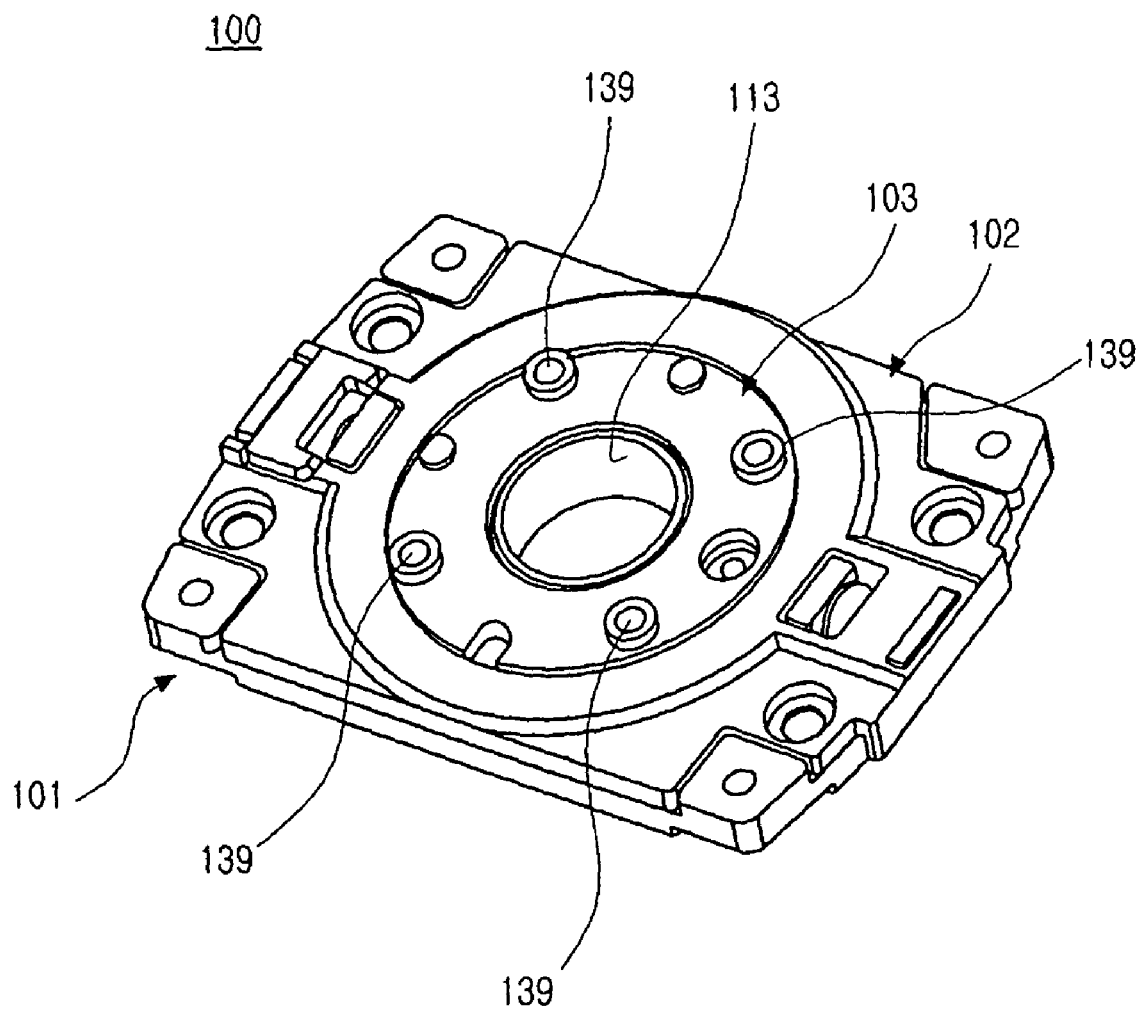
FIG. 1 is a perspective view illustrating a swing hinge apparatus according to an exemplary embodiment of the present invention.
Figure 2:
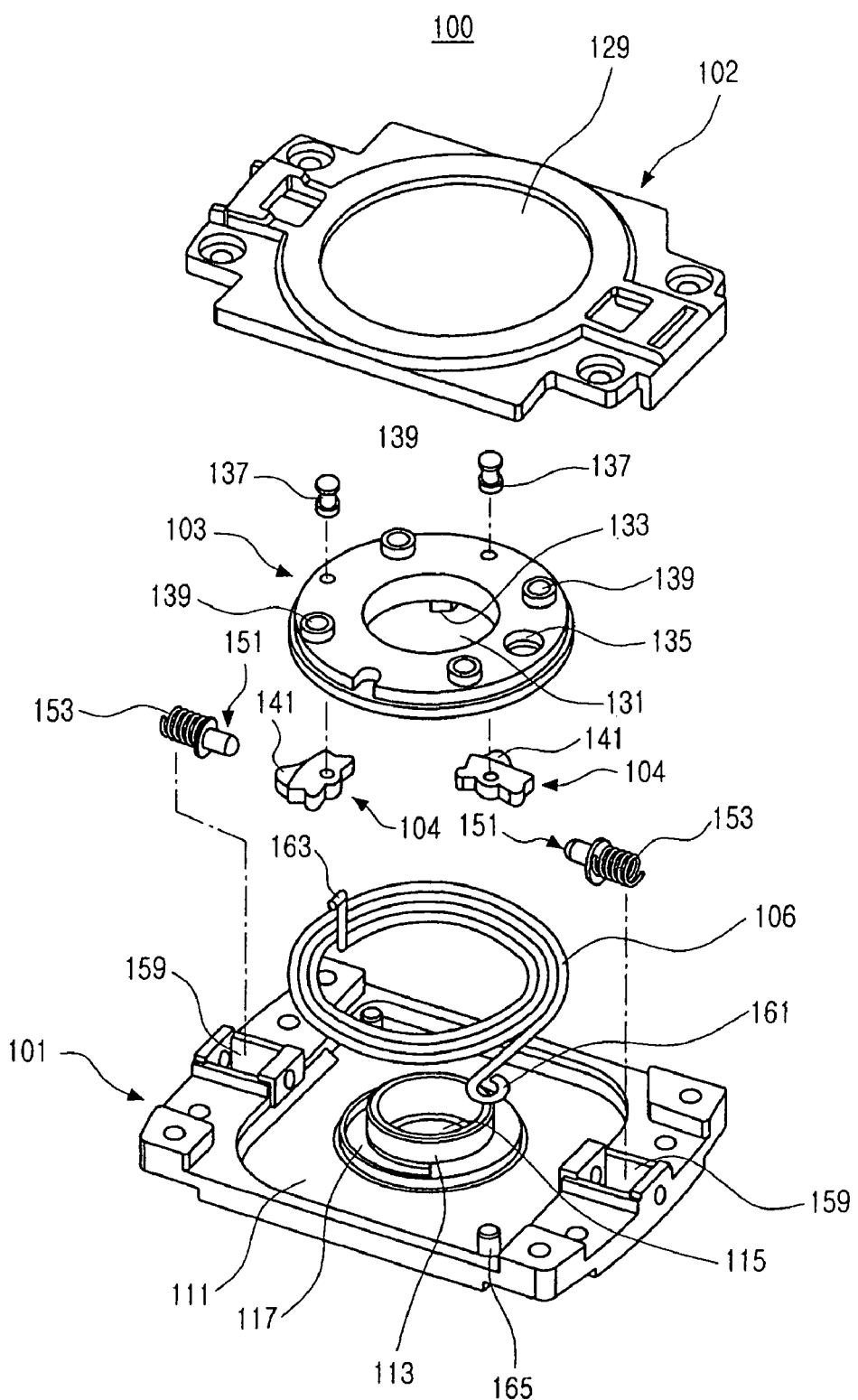
FIG. 2 is an exploded perspective view illustrating a swing hinge apparatus of FIG. 1.
Figure 3:
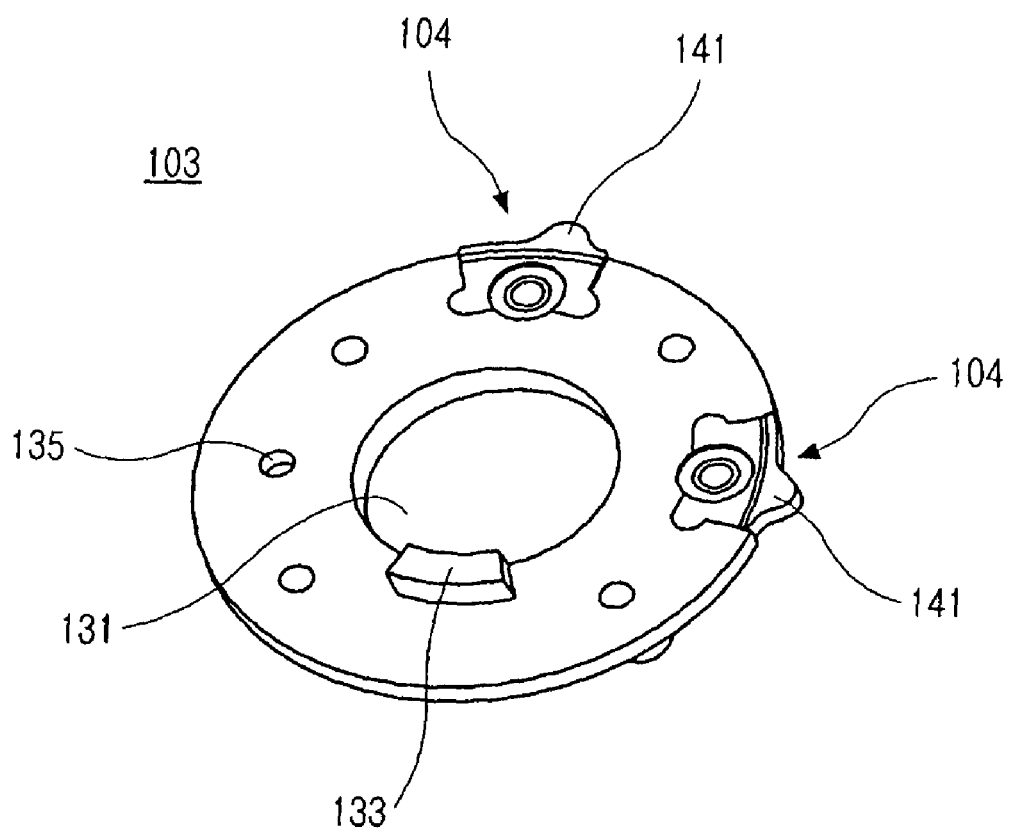
FIG. 3 is a perspective view illustrating an exemplary cam member of a swing hinge apparatus of FIG. 1.

As shown in FIGS. 1 and 2, a swing hinge apparatus 100 of a portable terminal has a lower casing 101 with which a cam member 103 is rotatably assembled, and a guide groove 117 formed on the lower casing 101 and a guide protrusion 133 formed on the cam member 103 are used to limit a range of rotation of the cam member 103, and a portion in which the guide protrusion 133 is engaged with the guide groove 117 is inclined.

The portion in which the guide protrusion 133 is engaged with the guide groove is inclined such that the guide protrusion 133 slidably contacts with an inner wall of the guide groove 117, so as to disperse impact when the guide protrusion 133 collides with the guide groove 117 and the rotation of the cam member 103 is stopped. That will be described in more detail through a configuration of the swing hinge apparatus 100.

Figure 8:
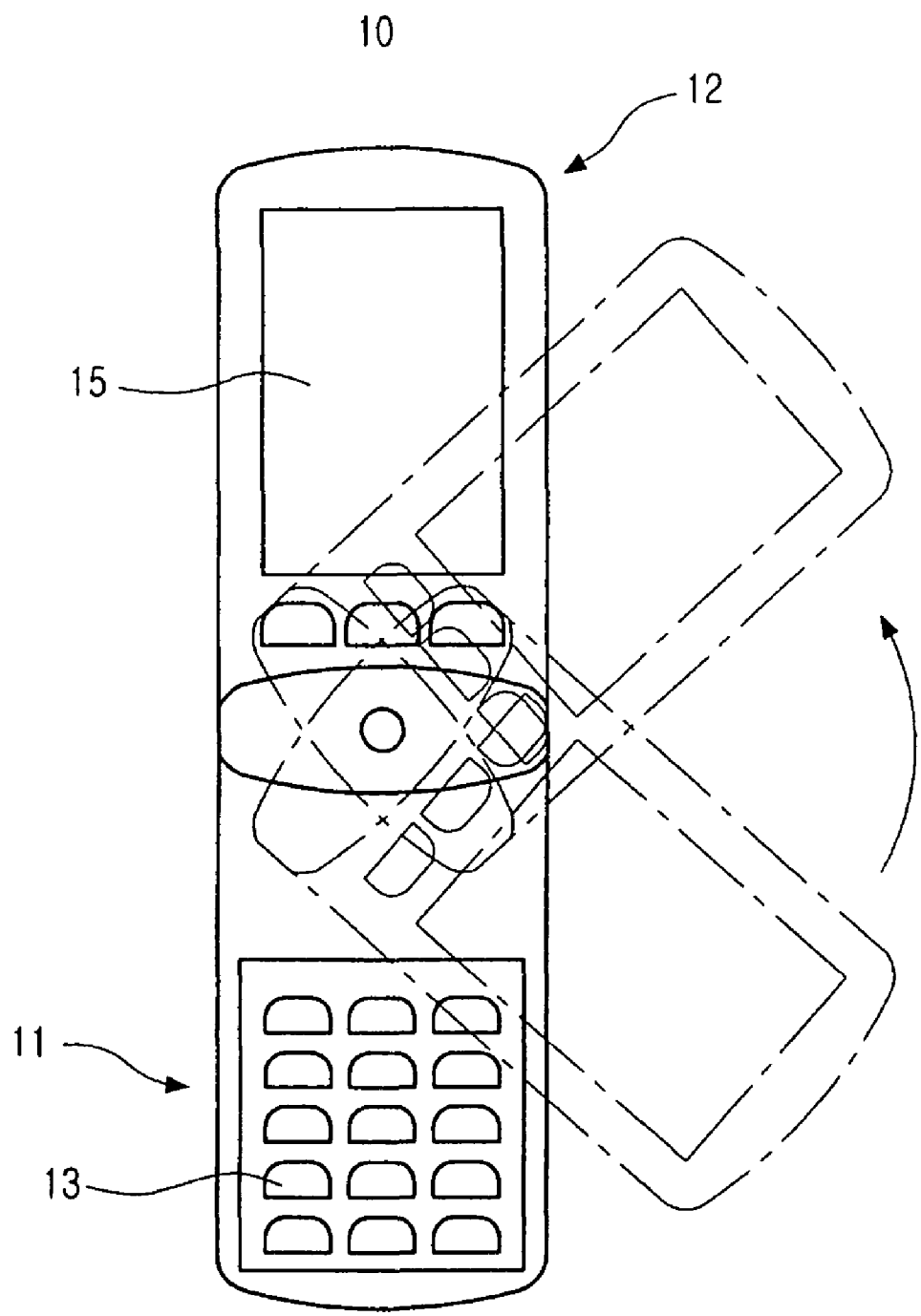
FIG. 8 is a plan view illustrating a portable terminal equipped with a swing hinge apparatus of FIG. 1.

Referring to FIG. 8, the portable terminal 10 has a pair of housings, and the lower casing 101 is mounted and fixed to any one of the housings and the cam member 103 is mounted and fixed to the other housing. Further, the cam member 103 is rotatably assembled with the lower casing 101 so that the housings are rotatably assembled while facing each other. Hereinafter, a housing on which the lower casing 101 is mounted denotes 'a first housing 11', and a housing on which the cam member 103 is mounted denotes 'a second housing 12'.

A keypad 13 is formed on one surface of the first housing 11, and a display device 15 is formed on one surface of the second housing 12. The display device 15 provides a user with information, such as the remaining power of a battery, the present time, whether to receive a message and the like, while maintaining a state of being exposed all the time. The keypad 13 is opened/hidden in accordance with rotation of the second housing 12, and is placed at a lower portion of the display device 15 in an open state. Therefore, when the keypad 13 is opened, a user can manipulate the keypad 13 while determining an input state through the display device 15.

Further, if a transmitter and a receiver are mounted on the first housing 11 and the second housing 12, respectively, a user can input a telephone number and make a call at another's telephone number while receiving a call, or when the keypad 13 is in an open state.

The swing hinge apparatus 100 can be employed in a mobile phone as well as any portable terminal 10 having a structure in which a pair of housings is assembled while facing each other. Therefore, the transmitter and the receiver are not illustrated in the drawings for describing of an exemplary embodiment of the present invention.

Figure 6:
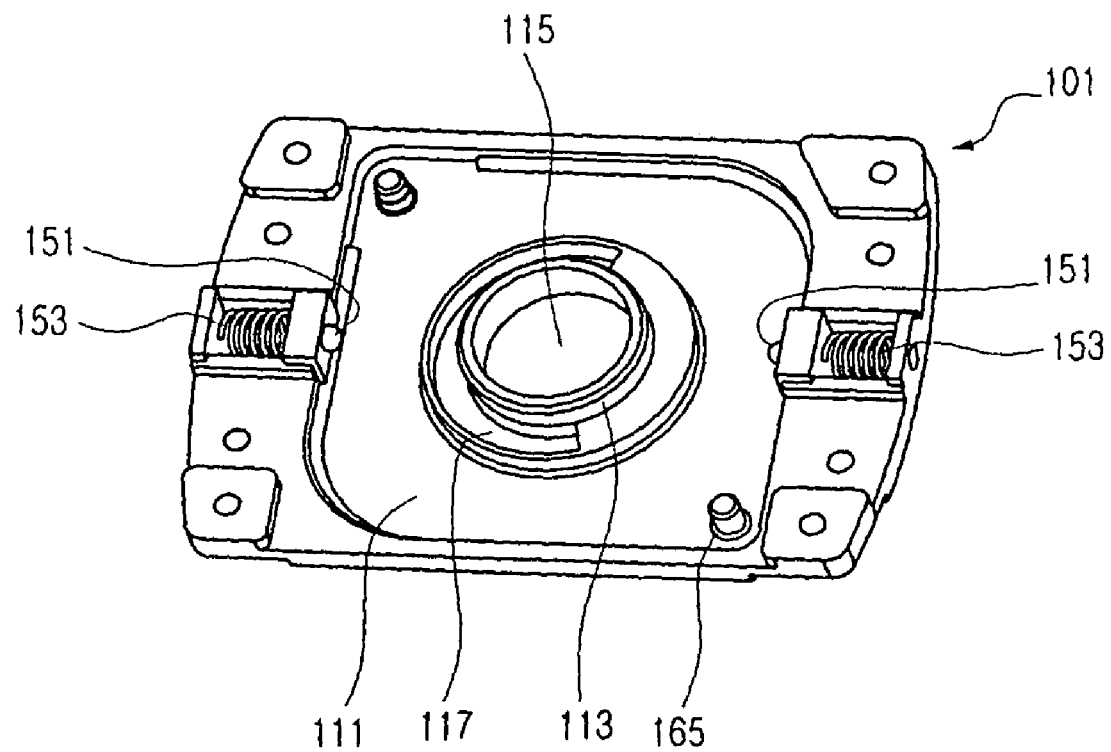
FIG. 6 is a perspective view illustrating an exemplary stopper pin installed on a lower casing of a swing hinge apparatus of FIG. 1.
Figure 7:
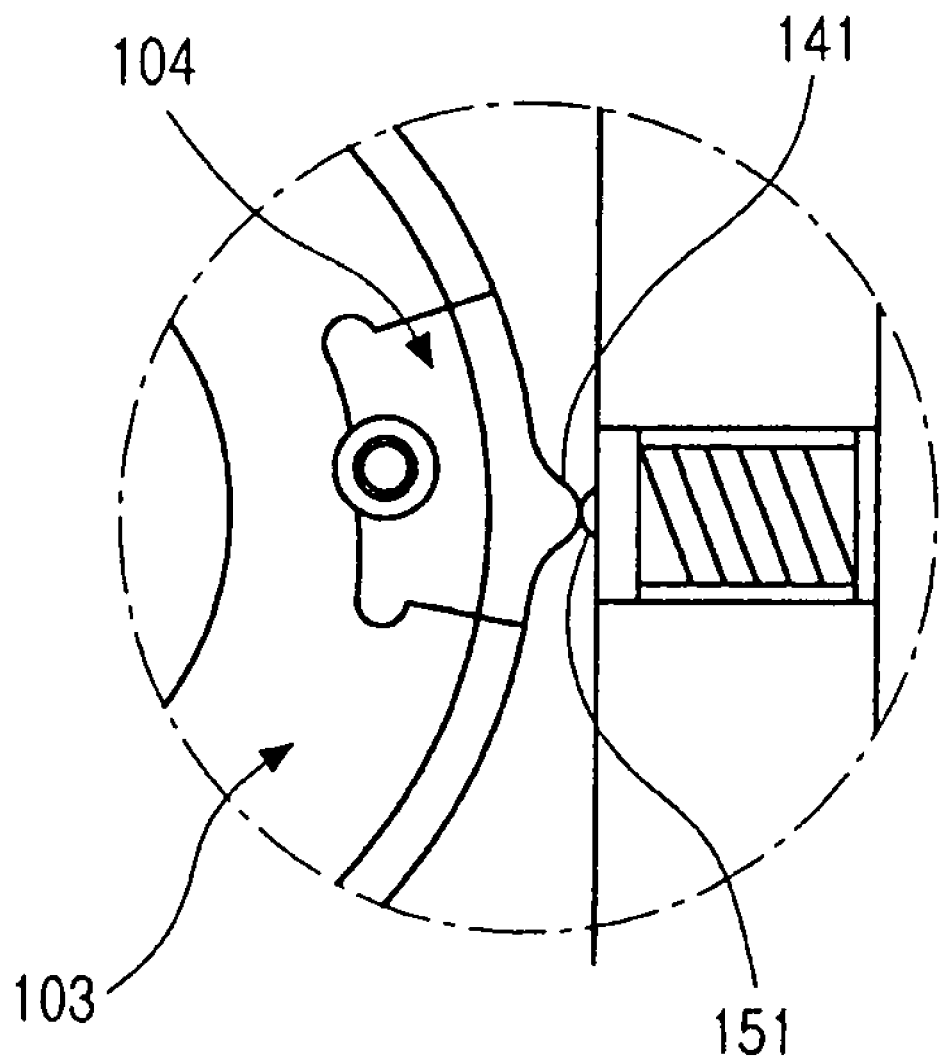
FIG. 7 is a diagram illustrating a stop state of an exemplary cam member of a swing hinge apparatus of FIG. 1.

Referring to FIGS. 1, 2 and 6, the lower casing 101 has a receiving recess 111 on the one surface thereof and receives the cam member 103, and the cam member 103 rotates within the first receiving recess 111. The other surface of the lower casing 101 is mounted to the one surface of the first housing 11 while facing each other so that the first receiving recess 111 is exposed to the one surface of the first housing 11.

A support member 113 protrudes at a center of the first receiving recess 111. The support member 113 has a through-hole 115 extending in its longitudinal direction and it has a cylinder shape, and the support member 113 is rotatably assembled with a rotation hole 131 formed on the cam member 103. Accordingly, the cam member 103 rotates centering on the support member 113.

The guide groove 117 is formed on the first receiving recess 111 enclosing the support member 113 by an angle. That is, the guide groove 117 is formed at an edge of the support member 113 and extends along a circumference thereof.

Referring to FIG. 8 again, it can be recognized that a range of rotation of the second housing 12 is 180 degrees. If the second housing 12 rotates by 180 degrees, the range of the rotation of the cam member 103 should be also limited by 180 degrees, which is set according to an extended angle of the guide groove 117. That is, the guide groove 117 limits a range of the angle by which the guide protrusion 133 moves to 180 degrees. Also, if the second housing 12 rotates within 90 degrees, the range of the angle by which the guide groove 117 extends should be limited so as to limit the range of the angle by which the guide protrusion 133 moves to 90 degrees.

Referring to FIGS. 2, 3, 4 and 5, the cam member 103 has a shape of a circular board and the rotation hole 131 is provided at the center of the cam member 103 extending through both surfaces of the cam member 103. As described above, the support member 113 of the lower casing 101 is assembled with the rotation hole 131, and the cam member 103 rotates within the lower casing 101 while being supported by the support member 113. The guide protrusion 133 is formed on one surface of the cam member 103, and is placed adjacent to the rotation hole 131. The guide protrusion 133 has a shape of a circular arc extending by an angle along the circumference of the cam member 103. The guide protrusion 133 moves along the guide groove 117 and is engaged with inner walls of both ends of the guide groove 117 so as to stop the rotation of the cam member 103. Thus, it is sufficient to have the shape of the circular arc extending by the range of 10 degrees to 20 degrees. If a product in which the range of the rotation of the second housing 12 is set to 180 degrees and the guide protrusion 133 has the circular arc shape extending by 10 degrees, the guide groove 117 should extend by 190 degrees. If the guide protrusion 133 has the circular arc shape extending by 20 degrees under the same condition, the guide groove 117 should extend by 200 degrees.

If the cam member 103 is assembled with the lower casing 101, the guide protrusion 133 is placed within the guide groove 117, and if the cam member 103 rotates, the guide protrusion 133 moves along the guide groove 117.

Figure 4:
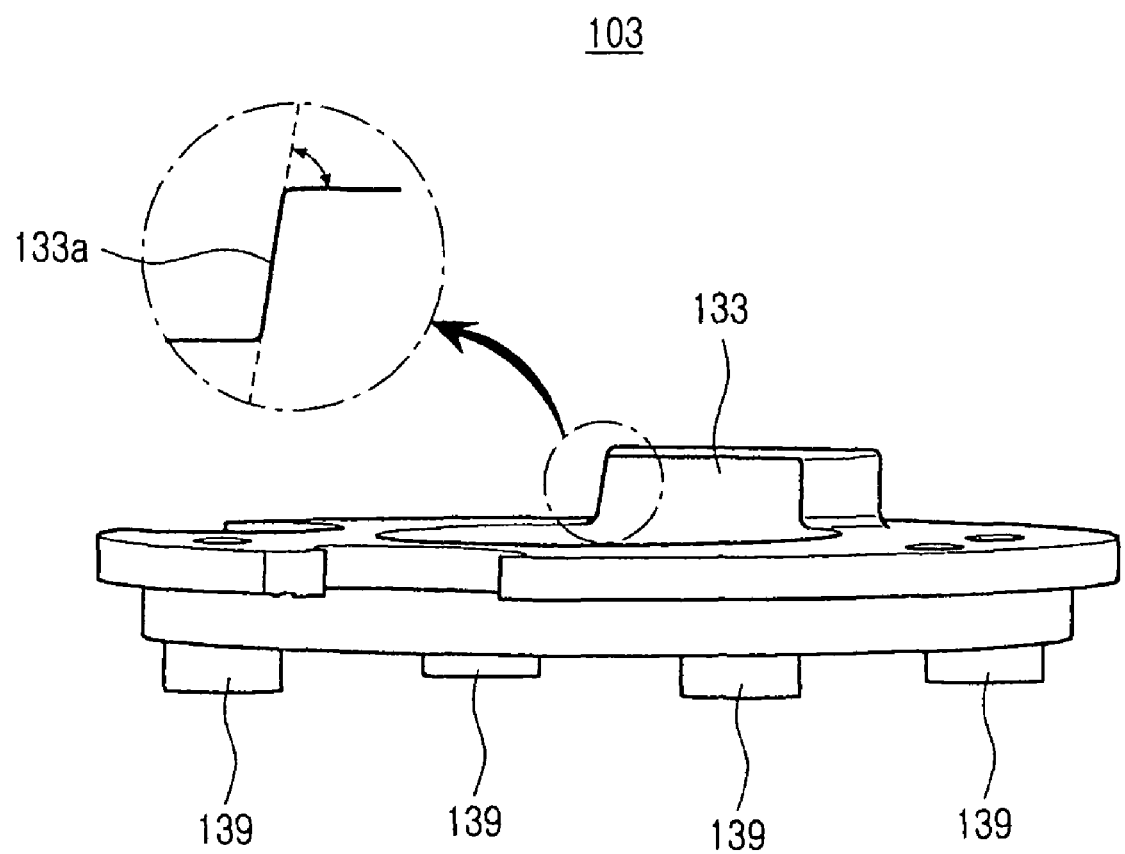
FIG. 4 is a perspective view illustrating an exemplary cam member of a swing hinge apparatus from another direction of FIG. 1.

In the meantime, as shown in FIG. 4, an outer wall 133a of one end of the guide protrusion 133 is inclined with respect to an upper part of the guide protrusion 133. At this time, the upper part of the guide protrusion 133 is formed to be parallel to the one surface of the cam member 103, and finally the outer wall 133a of the one end of the guide protrusion 133 is inclined to the one surface of the cam member 103. Likewise, the outer wall of the other end of the guide protrusion 133 is inclined with respect to the one surface of the cam member 103. In addition, the inner walls of both ends of the guide groove 117 are also inclined with respect to the one surface of the lower casing 101 with the same inclination as that of the outer walls of the both ends of the guide protrusion 133.

If the outer walls of both ends of the guide protrusion 133 are formed perpendicularly to one surface of the cam member 103 and the inner walls of both ends of the guide groove 117 are formed perpendicularly to one surface of the lower casing 101, impact occurring in stopping the rotation of the second housing 12 is concentrated at a portion where the guide protrusion 133 and the guide groove 117 are engaged with each other.

Accordingly, the outer walls of both ends of the guide protrusion 133 and the inner walls of both ends of the guide groove 117 are inclined so that the guide protrusion 133 slides along the inner walls of the guide groove 117 at the moment when the guide protrusion 133 collides with the inner walls of the guide groove 117, and thus impact is reduced.

Figure 5:
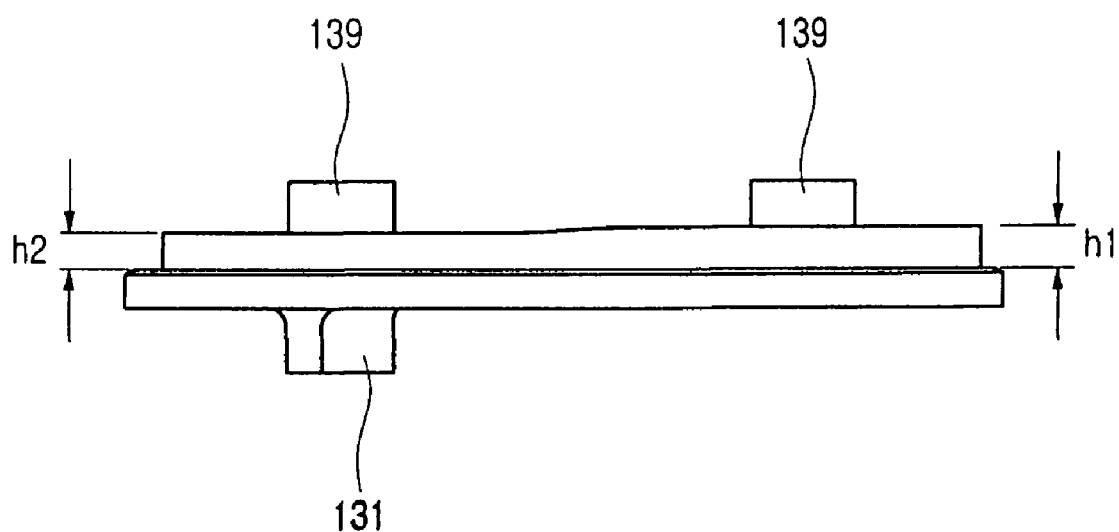
FIG. 5 is a side view illustrating an exemplary cam member of a swing hinge apparatus of FIG. 1.

As shown in FIG. 5, the other surface of the cam member 103 has a different height from between a height h1 of one part and a height h2 of the other part of the cam member. The different height is for compensating inclination of the cam member 103 which may occur because an elastic force of the elastic member 106 is not uniformly applied to the entire portion of the cam member 103 if an elastic member 106 is provided. In an exemplary embodiment of the present invention, the difference between the height h1 of the one part and the height h2 of the other part of the cam member 103 is set to 0.15 mm.

The cam member 103 is mounted to the second housing 12 while the other surface of the cam member 103 has contacts with the first housing 11. A plurality of fixing protrusions 139 is formed on the other surface of the cam member 103, and a plurality of screws (not shown) fixed on the second housing 12 is engaged with the fixing protrusions 139, respectively, so as to fix the cam member 103 to the second housing 12.

The lower casing 101 is mounted and fixed to the first housing 11, and the cam member 103 is mounted and fixed to the second housing 12, and further, the cam member 103 is rotatably received in the lower casing 101, in such a manner that the first housing 11 and the second housing 12 are rotatably assembled while facing each other. And as shown in FIG. 8, the second housing 12 rotates so as to open/close the one surface of the first housing 11.

The swing hinge apparatus 100 includes an upper casing 102 in order to prevent the cam member 103 from separating from the lower casing 101. The upper casing 102 includes an opening 129 extending through an inner surface and an outer surface thereof and is assembled with the lower casing 101 while facing each other. If the upper casing 102 is coupled to the lower casing 101, the cam member 103 is interposed between the lower casing 101 and the upper casing 102 to rotate, and the other surface of the cam member 103 is exposed to the outside through the opening 129. At this time, a part of an edge of the cam member 103 is engaged with the inner surface of the upper casing 102 and confined so as not to be separated from the lower casing 101.

The swing hinge apparatus 100 can include the elastic member 106 in order to provide a driving force for rotating the cam member 103. In an exemplary embodiment of the present invention, a spiral spring is used for the elastic member 106, and the elastic member 106 provides the driving force for rotating the cam member 103 and the second housing 12 in a direction of opening the one surface of the first housing 11.

The elastic member 106 is interposed between the lower casing 101 and the cam member 103, and one end 161 thereof is supported by the lower casing 101, and the other end 163 thereof is supported by the cam member 103, so as to provide the elastic force. In order to support both ends 161 and 163 of the elastic member 106, the lower casing 101 is provided with a support protrusion 165 and the cam member 103 is provided with a support hole 135, respectively. The one end of the elastic member 106 has a shape of a ring to be engaged enclosing the support protrusion 165, and the other end 163 of the elastic member 106 is bent as a predetermined shape not to be separated while being fitted to the support hole 135. The shape for supporting both ends 161 and 163 of the elastic member 106 to the lower casing 101 and the cam member 103, respectively, can be variously changed rather than the disclosed exemplary embodiment of the present invention.

In a state of closing the one surface of the first housing 11, the elastic member 106 provides the driving force for rotating the second housing 12 in a direction of opening the one surface of the first housing 11. Therefore, the swing hinge apparatus 100 includes a stopper means so as to maintain the state of closing the one surface of the first housing 11. In order to open the one surface of the first housing 11 through rotating the second housing 12, a user should rotate the second housing 12 by an angle and release a lock state of the stopper means. If the lock state of the stopper means has been released, the cam member 103 and the second housing 12 rotates by the elastic force of the elastic member 106 and thus the one surface of the first housing 11 is opened.

Hereinafter, an exemplary configuration of the stopper means will be described with reference to FIGS. 2, 3, 6 and 7. The stopper means is provided with a stopper pin 151 formed on the lower casing 101 and a stopper member 104 formed on the cam member 103.

The lower casing 101 is provided with a second receiving recess 159 so as to install the stopper pin 151. It is desirable that the second receiving recess 159 is formed on both sides of the first receiving recess 111 spaced apart by 180 degrees, respectively. The stopper pins 151 are received in the second receiving recesses 159, respectively, so that their ends are exposed out of the first receiving recess 111. A coil spring 153 is received within the second receiving recess 159 in order to maintain a state that the end of the stopper pin 151 is exposed out of the first receiving recess 111.

Therefore, if an external force is applied, the stopper pin 151 is pushed into the second receiving recess 159, and its end moves in a direction of being received in the second receiving recess 159. If the external force is removed, the end of the stopper pin 151 protrudes from the first receiving recess 111 by the elastic force of the coil spring 153.

A stopper protrusion 141 is formed on an outer circumference of the stopper member 104, and it is fixed on a fixing groove (not shown) formed on the one surface of the cam member 103 by a screw 137. If the stopper member 104 is mounted to the fixing groove, the stopper protrusion 141 protrudes toward the outer circumference of the cam member 103. If the cam member 103 rotates within the first receiving recess 111, the stopper protrusion 141 is engaged with an end of any one of the stopper pins 151, so as to stop the rotation of the cam member 103 at a certain position.

A pair of stopper protrusions 141 is formed spaced apart by 90 degrees along the circumference of the cam member 103, so as to stop the rotation of the second housing 12 spaced apart by 90 degrees. That will be described in more detail below.

It is not necessary to manufacture the stopper member 104 separated from the cam member 103. The stopper member 104 makes it easy to form the stopper protrusion 141, and thus an exemplary embodiment of the present invention discloses a form of the stopper protrusion 141 manufactured so as to be separated from the cam member 103, as a configuration of forming the stopper protrusion 141. That is, if it is possible that the stopper protrusion 141 is manufactured protruding toward the outer circumference of the cam member 103, the stopper member 104 can be manufactured integrally with the cam member 103.

When the one surface of the first housing 11 is closed, the elastic member 106 provides the driving force for rotating the second housing 12 in the direction of opening the one surface of the first housing 11. At this time, one of the stopper protrusions 141 is engaged with one of the stopper pins 151 so as to maintain a stop state of the second housing 12, and to be specific, the cam member 103. At this time, the guide protrusion 133 is in a state of contacting the inner wall of the one end of the guide groove 117.

If a user rotates the second housing 12 in one direction in order to open the one surface of the first housing 11, the stopper protrusion 141 comes into sliding contact with the end of the stopper pin 151, and then goes on moving while pushing the stopper pin 151 into the second receiving recess 159. If the stopper protrusion 141 is completely out of the state of being engaged with the stopper pin 151, the second housing 12 rotates by the elastic force of the elastic member 106.

If the second housing 12 rotates from a first position in which the one surface of the first housing 11 is closed, the other stopper protrusion 141 becomes adjacent to the other stopper pin 151. If the second housing 12 approaches a second position by rotating 90 degrees from the first position, the other stopper protrusion 141 is engaged with the other stopper pin 151. Accordingly, the rotation of the second housing 12 can be stopped at the second position, which is allowed because the pair of the stopper pins 151 are placed spaced apart by 180 degrees, and the pair of the stopper protrusions 141 are placed spaced apart by 90 degrees.

If the second housing 12 rotates passing the second position, the one of the stopper protrusions 141 gradually approaches the other stopper pin 151, and if the second housing 12 approaches a third position by rotating 180 degrees from the first position, the one of the stopper protrusions 141 is engaged with the other stopper pin 151. Therefore, the rotation of the second housing 12 is stopped at the third position. At this time, the guide protrusion 133 is in a state of being engaged with the inner wall of the other end of the guide groove 117.

When the second housing 12 rotates from the first or the second position and approaches the third position, the outer wall of the guide protrusion 133 collides with the inner wall of the other end of the guide groove 117. At the moment of colliding the guide protrusion 133 with the inner wall of the guide groove 117, the guide protrusion 133 slides along the inner wall of the other end of the guide groove 117 such that the impact occurring between the guide protrusion 133 and the guide groove 117 is lessened.

Meanwhile, it will be understood by those skilled in the art that a stop force between the stopper protrusion 141 and the stopper pin 151 by the elastic force of the coil spring 153 should be greater than the elastic force of the elastic member 106. In other words, the cam member 103 and the second housing 12 rotated by the elastic force of the elastic member 106 should be stopped by engagement between the stopper protrusion 141 and the stopper pin 151.

As described above, the driving force by the elastic member 106 is applied even when the one surface of the first housing 11 is closed so that the stopper means is formed in order to maintain the state of closing the one surface of the first housing 11. Therefore, the single stopper protrusion 141 and the single stopper pin 151 are formed, respectively, so that the stop state of the second housing 12 can be maintained when the one surface of the first housing 11 is closed. If the single stopper protrusion 141 and the single stopper pin 151 are formed, respectively, the second housing 12 may rotate from the first position to the third position without stopping.

In an exemplary embodiment of the present invention, a pair of the stopper protrusions 141 and the stopper pins 151 is formed, respectively, so as to exemplify a formation that enables the second housing 12 to rotate by 180 degrees from the first position and to stop spaced apart by 90 degrees.

That is, the number of stopper protrusions 141 and stopper pins 151 can be variable according to a space of an angle by which the second housing 12 is stopped.

As described above, the swing hinge apparatus according to an exemplary embodiment of the present invention is assembled with a pair of the housings, and has a configuration of rotating the cam member within the lower casing, so as to make the rotation of the portable terminals stable. Further, the upper casing is assembled with the lower casing, and the cam member is assembled with the lower casing so that the structural stability can be improved. At the end, the swing hinge apparatus of an exemplary embodiment of the present invention itself can obtain the stability of the structure and the rotating operation such that the costs for manufacturing can be reduced. Furthermore, the elastic member is provided between the lower casing and the cam member, and provides the driving force for rotating the housing of the portable terminal such that the open/close operation is convenient, and it makes the inner wall of the guide protrusion and the guide groove for limiting the range of the rotation of the housings of the portable terminal is inclined so that the impact occurring in stopping the rotation can be lessened. Accordingly, it can decrease the risk of the breakdown of the portable terminal which is opened/closed by the swing operation.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A swing hinge apparatus of a portable terminal, by which a pair of housings of the portable terminal are rotatably assembled while facing each other, the swing hinge apparatus comprising:
    a lower casing mounted to a first housing from among the pair of housings;
    a cam member mounted to a second housing from among the pair of housings and rotatably received in the lower casing;

a guide groove formed on the lower casing and extending along a circumference; and a guide protrusion formed on a first surface of the cam member and moving along the guide groove according to rotation of the cam member, wherein both ends of the guide protrusion have inclined outer walls, both ends of the guide groove have inclined inner walls, and the guide protrusion is engaged with one of the inclined inner walls of the both ends of the guide groove, so as to limit a range of rotation of the cam member.

2. The swing hinge apparatus as claimed in claim 1, wherein the outer walls of the both ends of the guide protrusion are inclined 80 degrees with respect to the first surface of the cam member, and the inner walls of the both ends of the guide groove are inclined 80 degrees with respect to one surface of, the lower casing.

3. The swing hinge apparatus as claimed in claim 1, wherein the guide protrusion comprises a shape of a circular arc extending along the circumference of the cam member.

4. The swing hinge apparatus as claimed in claim 1, wherein the cam member comprises a second surface opposite to the first surface and comprising parts with different heights, and is assembled with the second housing while being in contact with the first housing.

5. The swing hinge apparatus as claimed in claim 1, further comprising an upper casing assembled with the lower casing while facing each other, wherein the cam member is rotatably interposed between the lower casing and the upper casing.

6. The swing hinge apparatus as claimed in claim 5, wherein the upper casing comprises an opening which extends through an inner surface and an outer surface thereof, so that the second surface of the cam member is exposed through the opening.

7. The swing hinge apparatus as claimed in claim 1, wherein the lower casing comprises:
a first receiving recess formed on the one surface of the lower casing;
a support member having a cylinder shape protruding from the first receiving recess; and
a through-hole extending through the support member,
wherein the guide groove is formed on the first receiving recess along an edge of the support member.

8. The swing hinge apparatus as claimed in claim 7, wherein the cam member comprises a rotation hole extending through the both surfaces thereof, and the support member is rotatably received in the rotation hole.

9. The swing hinge apparatus as claimed in claim 7, further comprising:
a support protrusion protruding from the first receiving recess of the lower casing;
a support hole formed on the cam member; and
an elastic member of which one end is supported by the support protrusion and the other end is supported by the support hole,
wherein the cam member rotates by receiving an elastic force of the elastic member.

10. The swing hinge apparatus as claimed in claim 9, wherein the elastic member comprises a spiral spring.

11. The swing hinge apparatus as claimed in claim 9, wherein one surface of the first housing to which the lower casing is mounted and fixed is opened and closed according to rotation of the second housing to which the cam member is mounted and fixed, together with the cam member, and the elastic member provides a driving force for rotating the cam member and the second housing in a direction of which the one surface of the first housing is opened.

12. The swing hinge apparatus as claimed in claim 9, wherein the cam member comprises the second surface opposite to the first surface, and the second surface comprises parts with different heights and is assembled with the second housing while being in contact with the second housing.

13. The swing hinge apparatus as claimed in claim 7, further comprising:
at least one stopper pin formed on the lower casing while the stopper pin can be drawn out of or into the first receiving recess; and
at least one stopper protrusion formed on the cam member and protruding toward an outer surface of the cam member,
wherein the stopper protrusion is engaged with the stopper pin according to rotation of the cam member so as to stop the rotation of the cam member.

14. The swing hinge apparatus as claimed in claim 13, further comprising:
a second receiving recess formed on an edge of the first receiving recess; and
a coil spring received in the second receiving recess,
wherein the stopper pin is received in the second receiving recess, and the elastic force of the coil spring is applied to the stopper pin, so as to push the stopper pin to expose an end of the stopper pin out of the first receiving recess.

15. The swing hinge apparatus as claimed in claim 13, further comprising:
a fixing groove formed on the first surface of the cam member and being adjacent to the outer surface of the cam member; and
a stopper member mounted and fixed to the fixing groove,
wherein the stopper protrusion is formed on the stopper member and protrudes toward the outer surface of the cam member.

16. The swing hinge apparatus as claimed in claim 13, wherein the stopper pin is formed on both sides of the first receiving recess, respectively.

17. The swing hinge apparatus as claimed in claim 16, wherein a pair of the stopper protrusions is formed along the circumference of the cam member while being spaced apart from each other by 90 degrees, one stopper protrusion from among the pair of the stopper protrusions is engaged with one of the stopper pins at a first position to limit the rotation of the cam member, another stopper protrusion is engaged with another stopper pin at a second position at which the cam member has rotated 90 degrees from the first position in one direction, to limit the rotation of the cam member, and said one stopper protrusion is engaged with said another stopper pin at a third position at which the cam member has rotated 180 degrees from the first position in one direction, so as to limit the rotation of the cam member.

* * * * *